Feb. 3, 1931.  L. E. LA BRIE  1,780,670

BRAKE OPERATING MEANS

Filed May 6, 1927

INVENTOR
LUDGER E. LA BRIE
BY
*M. W. McConkey*
ATTORNEY

Patented Feb. 3, 1931

1,790,670

UNITED STATES PATENT OFFICE

LUDGER E. LA BRIE, OF SOUTH BEND, INDIANA, ASSIGNOR TO BENDIX BRAKE COMPANY, OF CHICAGO, ILLINOIS, A CORPORATION OF ILLINOIS

BRAKE-OPERATING MEANS

Application filed May 6, 1927. Serial No. 189,224.

This invention relates to brakes and is illustrated as embodied in novel operating means for an internal expanding automobile brake. An object of the invention is to provide a very simple mounting for a brake-applying device so arranged as to permit the device to shift to center itself with respect to the brake shoes when the brake is applied. In one desirable arrangement the brake-applying means includes a shaft, such as a cam-shaft, journalled in a bracket which is held by a pivotal support or friction clamp on the side opposite to that toward which the brake-applying thrust is directed. Thus the brake-applying thrust aids in causing the shifting of the bracket or its equivalent to bring about the desired automatic centering.

The above and other novel and desirable features of construction will be apparent from the following description of the illustrative embodiment of the invention shown in the accompanying drawing, in which.

Figure 2:
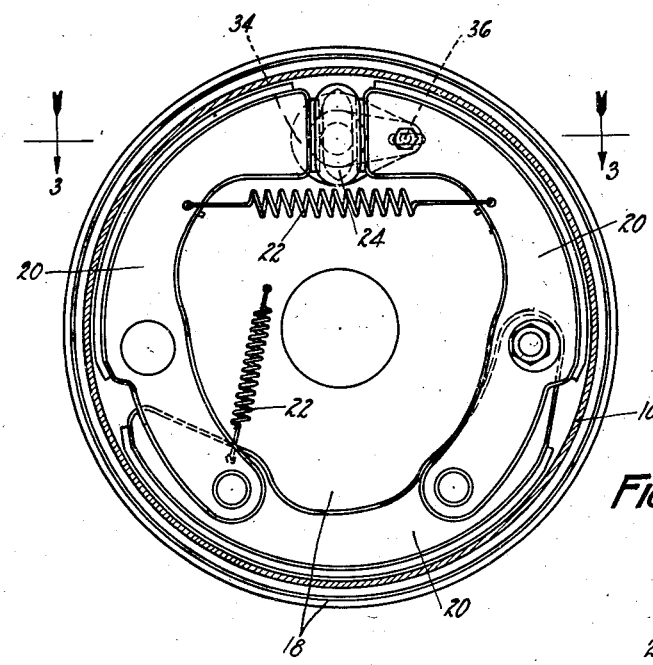
Figure 2 is a vertical section through the brake just inside the head of the brake drum, and on the line 2—2 of Figure 1 showing the brake shoes in side elevation.
Figure 1:
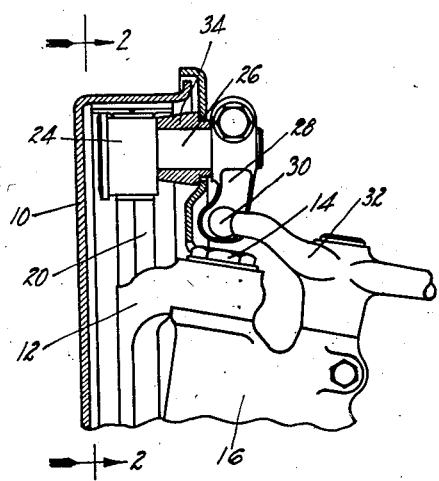
Figure 1 is a vertical section through the upper part of one front wheel and associated parts.
Figure 3:
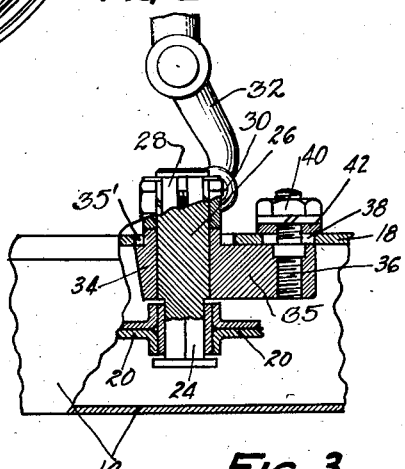
Figure 3 is a partial section on the line 3—3 of Figure 2 showing the mounting of the above-identified bracket.

In the arrangement selected for illustration the brake includes a drum 10 rotating with a wheel (not shown) mounted on a front wheel knuckle 12 swivelled by a king-pin 14 or the like at one end of a front axle 16. The drum 10 is closed at its open side by a suitable stationary backing plate 18. The brake proper includes brake shoes 20 applied against the resistance of suitable return springs 22 by means such as a double cam 24 herein illustrated as integral with a camshaft 26. Shaft 26 is rocked to apply the brake by a crank or arm 28 having its lower end flattened to form a "spade" portion engaged by an integral ball 30 on one end of an operating lever 32 fulcrumed on the axle 16. The center of the ball 30 is arranged, when the drum is applied, in or immediately adjacent the swivelling axis of the wheel.

According to an important feature of the present invention, the cam-shaft 26 or its equivalent is journalled in a novel bracket 34 preferably having an arm portion 35 extending laterally along a chord of the drum, both arm and lever 32 lying to one side of the cam shaft. The bolt or stud 36 passes through a slot 38 in the backing plate 18 and is provided with a nut 40 compressing a friction washer 42 against the backing plate 18. Backing plate 18 is likewise enlarged at 35′ to accommodate lateral movement of the bracket 34.

It will be seen that, when the brake is applied, the thrust of the lever 32 against the crank 28 is away from the attaching bolt 36, so that there is no tendency to shift the bracket in any direction except along a chord of the brake drum. The pressure of the cam 24 on the ends of the shoes 20 will cause the shifting of means 40 and 42 to center the cam 24 when the brake is applied.

While one illustrative embodiment has been described in detail, it is not my intention to limit the scope of the invention to that particular embodiment or otherwise than by the terms of the appended claims.

I claim:

1. Brake-operating mechanism comprising, in combination, an applying device movable in all directions in the plane of the support, an operating member exerting thrust on the applying device, a support for the applying device, and means for frictionally clamping the support only on the side of the applying device opposite that toward which said thrust is directed, in such a manner as to permit the applying device to shift to center itself when the brake is applied.

2. A brake comprising, in combination, a drum, a backing plate, friction means engageable with the drum, an applying device for the friction means having a support extending through and movable in all directions in said orifice with a portion of said support extending substantially along a chord of the drum, and a single attaching bolt for said support arranged at the end of said portion and securing it to the backing plate, the bolt passing through a relatively large opening to permit the support to shift along said chord.

In testimony whereof, I have hereunto signed my name.

LUDGER E. LA BRIE.